United States Patent
He

(10) Patent No.: US 11,641,574 B2
(45) Date of Patent: May 2, 2023

(54) PUBLIC WARNING SYSTEM PROCEDURES

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/391,682

(22) Filed: Aug. 2, 2021

(65) Prior Publication Data
US 2022/0046403 A1 Feb. 10, 2022

Related U.S. Application Data

(60) Provisional application No. 63/063,374, filed on Aug. 9, 2020.

(51) Int. Cl.
H04W 4/90 (2018.01)
H04W 4/021 (2018.01)
H04W 24/08 (2009.01)

(52) U.S. Cl.
CPC ............. *H04W 4/90* (2018.02); *H04W 4/021* (2013.01); *H04W 24/08* (2013.01)

(58) Field of Classification Search
CPC ....... H04W 4/021; H04W 4/025; H04W 4/12; H04W 4/90; H04W 24/08; H04W 24/10
See application file for complete search history.

(56) References Cited

U.S. PATENT DOCUMENTS

| 6,317,060 B1 | 11/2001 | Jones | |
|---|---|---|---|
| 6,496,568 B1 * | 12/2002 | Nelson | H04M 3/487 379/88.19 |
| 7,987,234 B1 * | 7/2011 | Waldorf | G06T 11/206 709/204 |
| 10,911,924 B2 * | 2/2021 | Liu | H04W 60/00 |
| 2007/0052533 A1 * | 3/2007 | Glazer | G08B 21/0227 340/539.11 |
| 2009/0281888 A1 * | 11/2009 | Zai | G06Q 30/0237 715/764 |
| 2014/0269465 A1 * | 9/2014 | Ballantyne | H04L 67/62 370/312 |
| 2014/0348072 A1 * | 11/2014 | May-Weymann | H04W 48/16 370/329 |

(Continued)

OTHER PUBLICATIONS

Apple: "Change Indication for PWS SIBs", 3GPP TSG-RAN WG2 Meeting #103, 3GPP Draft, R2-1812793_Change Indication for PWS SIBs, 3rd Generation Partnership Project (3GPP), Mobile Competence Centre, 650, Route Des Lucioles, F-06921 Sophia-Antipolis Cedex, France, vol. RAN WG2, No. Gothenburg, Sweden, Aug. 20, 2018-Aug. 24, 2018, Aug. 10, 2018 (Aug. 10, 2018), 6 Pages, XP051522385, Retrieved from the Internet: URL: http://www.3gpp.org/ftp/tsg%5Fran/WG2%5FRL2/TSGR2%5F103/Docs/R2%2D1812793%2Ezip [retrieved on Aug. 10, 2018].

(Continued)

*Primary Examiner* — Jean A Gelin

(74) *Attorney, Agent, or Firm* — Patterson + Sheridan, LLP

(57) ABSTRACT

Certain aspects of the present disclosure provide techniques for a public warning system. A method that may be performed by a user equipment (UE) includes receiving, from a network entity, an indication of a monitoring schedule for public warning notifications, and monitoring for a public warning notification based on the monitoring schedule.

22 Claims, 11 Drawing Sheets

(56) References Cited

U.S. PATENT DOCUMENTS

| | | | | |
|---|---|---|---|---|
| 2014/0357183 | A1* | 12/2014 | Rathonyi | H04H 20/59 |
| | | | | 455/3.01 |
| 2015/0365809 | A1* | 12/2015 | Lemberg | G10L 13/08 |
| | | | | 455/404.1 |
| 2017/0132908 | A1* | 5/2017 | Miasnik | G08B 27/005 |
| 2019/0380019 | A1* | 12/2019 | Buckley | H04W 76/16 |
| 2022/0201438 | A1* | 6/2022 | Sharma | H04W 4/90 |

OTHER PUBLICATIONS

Huawei., et al., "PDCCH-Based Power Saving Signal/Channel", 3GPP TSG RAN WG1 Meeting #98bis, 3GPP Draft, R1-1910076, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), 21 Pages XP051808414, Retrieved from the Internet: URL: https://ftp.3gpp.org/tsg_ran/WG1_RL1/TSGR1_98b/Docs/R1-1910076.zip R1-1910076.docx [retrieved on Oct. 5, 2019], Section 2 .1.1 "Functionalities carried by the new DCI format outside Active Time", pp. 2-3, figure 1.

International Search Report and Written Opinion—PCT/US2021/044361—ISA/EPO—dated Dec. 14, 2021.

* cited by examiner

PUBLIC WARNING SYSTEM PROCEDURES

CROSS-REFERENCE TO RELATED APPLICATION

The present Application for Patent claims priority to U.S. Provisional Application No. 63/063,374, filed Aug. 9, 2020, which is hereby expressly incorporated by reference herein in its entirety.

BACKGROUND

Field of the Disclosure

Aspects of the present disclosure relate to wireless communications, and more particularly, to techniques for monitoring and/or transmitting public warning notifications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include public warning system procedures that may enable desirable power consumption at a wireless communication device, such as a user equipment.

Certain aspects of the subject matter described in this disclosure can be implemented in a method for wireless communication by a user equipment (UE). The method generally includes receiving, from a network entity, an indication of a monitoring schedule for public warning notifications, and monitoring for a public warning notification based on the monitoring schedule.

Certain aspects of the subject matter described in this disclosure can be implemented in a method for wireless communication by a network entity (e.g., a base station). The method generally includes transmitting, to a UE, an indication of a monitoring schedule for public warning notifications, and transmitting, to the UE, a public warning notification based on the monitoring schedule.

Certain aspects of the subject matter described in this disclosure can be implemented in a method for wireless communication by a UE. The method generally includes receiving, from a network entity, a first signal indicating that a first public warning notification is available for reception, and receiving, from the network entity and after the first signal, the first public warning notification based on the first signal.

Certain aspects of the subject matter described in this disclosure can be implemented in a method for wireless communication by a network entity (e.g., a base station). The method generally includes transmitting, to a UE, a first signal indicating that a first public warning notification is available for reception, and transmitting, to the UE and after the first signal, the first public warning notification based on the first signal.

Certain aspects of the subject matter described in this disclosure can be implemented in an apparatus for wireless communication. The apparatus generally includes a memory and a processor, which is coupled to the memory. The processor and the memory are configured to receive, from a network entity, an indication of a monitoring schedule for public warning notifications, and monitor for a public warning notification based on the monitoring schedule.

Certain aspects of the subject matter described in this disclosure can be implemented in an apparatus for wireless communication. The apparatus generally includes a memory and a processor, which is coupled to the memory. The processor and the memory are configured to transmit, to a UE, an indication of a monitoring schedule for public warning notifications, and transmit, to the UE, a public warning notification based on the monitoring schedule.

Certain aspects of the subject matter described in this disclosure can be implemented in an apparatus for wireless communication. The apparatus generally includes a memory and a processor, which is coupled to the memory. The processor and the memory are configured to receive, from a network entity, a first signal indicating that a first public warning notification is available for reception, and receive, from the network entity and after the first signal, the first public warning notification based on the first signal.

Certain aspects of the subject matter described in this disclosure can be implemented in an apparatus for wireless communication. The apparatus generally includes a memory and a processor, which is coupled to the memory. The processor and the memory are configured to transmit, to a UE, a first signal indicating that a first public warning notification is available for reception, and transmit, to the UE and after the first signal, the first public warning notification based on the first signal.

Certain aspects of the subject matter described in this disclosure can be implemented in an apparatus for wireless communication. The apparatus generally includes means for receiving, from a network entity, an indication of a monitoring schedule for public warning notifications; and means for monitoring for a public warning notification based on the monitoring schedule.

Certain aspects of the subject matter described in this disclosure can be implemented in an apparatus for wireless communication. The apparatus generally includes means for transmitting, to a UE, an indication of a monitoring schedule for public warning notifications; and means for transmitting, to the UE, a public warning notification based on the monitoring schedule.

Certain aspects of the subject matter described in this disclosure can be implemented in an apparatus for wireless communication. The apparatus generally includes means for receiving, from a network entity, a first signal indicating that a first public warning notification is available for reception; and means for receiving, from the network entity and after the first signal, the first public warning notification based on the first signal.

Certain aspects of the subject matter described in this disclosure can be implemented in an apparatus for wireless communication. The apparatus generally includes means for transmitting, to a UE, a first signal indicating that a first public warning notification is available for reception; and means for transmitting, to the UE and after the first signal, the first public warning notification based on the first signal.

Certain aspects of the subject matter described in this disclosure can be implemented in a computer readable medium having instructions stored thereon for receiving, from a network entity, an indication of a monitoring schedule for public warning notifications; and monitoring for a public warning notification based on the monitoring schedule.

Certain aspects of the subject matter described in this disclosure can be implemented in a computer readable medium having instructions stored thereon for transmitting, to a UE, an indication of a monitoring schedule for public warning notifications; and transmitting, to the UE, a public warning notification based on the monitoring schedule.

Certain aspects of the subject matter described in this disclosure can be implemented in a computer readable medium having instructions stored thereon for receiving, from a network entity, a first signal indicating that a first public warning notification is available for reception; and receiving, from the network entity and after the first signal, the first public warning notification based on the first signal.

Certain aspects of the subject matter described in this disclosure can be implemented in a computer readable medium having instructions stored thereon for transmitting, to a UE, a first signal indicating that a first public warning notification is available for reception; and transmitting, to the UE and after the first signal, the first public warning notification based on the first signal.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
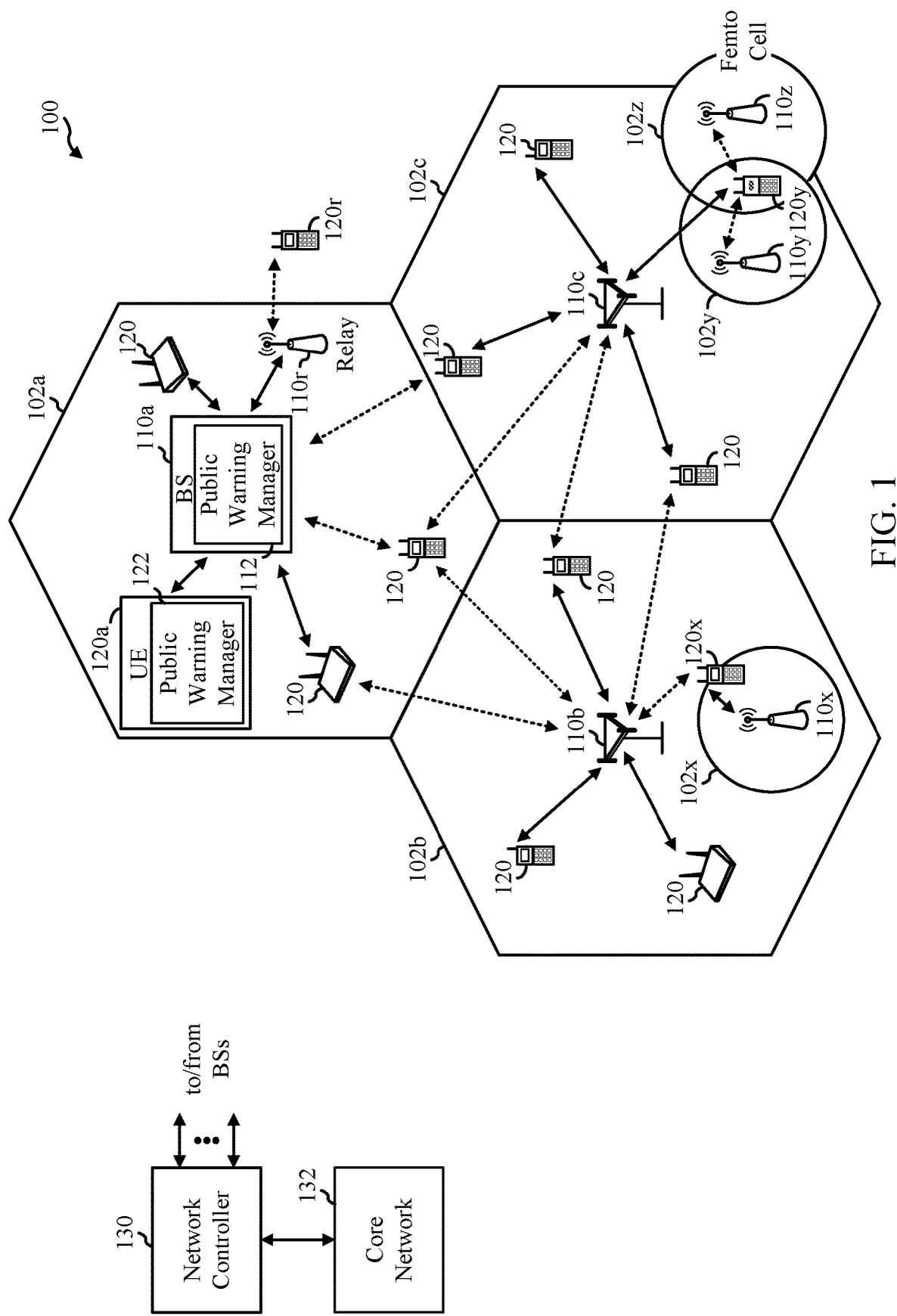
FIG. 1 is a block diagram conceptually illustrating an example wireless communication network, in accordance with certain aspects of the present disclosure.

Aspects of the present disclosure provide apparatus, methods, processing systems, and computer readable mediums for public warning system (PWS) procedures. The various public warning system (PWS) procedures described herein may facilitate desirable power consumption at a user equipment. For example, the various PWS procedures described herein may enable the UE to reduce the monitoring frequency for public warning notifications, and thus, the UE may consume less power monitoring for public warning notifications, which may provide desirable power consumption at the UE. For instance, the radio access network (RAN)

may advertise how often the UE should monitor for a public warning notification. A configurable monitoring schedule at the UE may enable a RAN to implement various monitoring schedules, for example, depending on geographical areas and/or time of day. As an example, the RAN may configure the UE to monitor for public warning notifications more frequently during the day and less frequently during the night.

In certain cases, the RAN may transmit a specific signal that indicates whether there is a new public warning notification. In certain aspects, a dedicated channel may be used to transmit the specific signal. Due to the limited information conveyed by the specific signal, the UE may have a separate circuit or module (such as a transceiver) dedicated to monitoring the specific signal at a reduced power level, for example, compared to other cellular transceivers. In such cases, the In certain cases, the RAN may advertise a repetition pattern for public warning notifications to the UE, and the public warning notification may include a notification identifier and a repetition identifier. The repetition pattern along with the identifiers may enable the UE to refrain from monitoring for certain repetitions of a public warning notification once the UE successfully receives a public warning notification within the repetition pattern.

The following description provides examples of public warning system procedures in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network).

According to certain aspects, the BSs 110 and UEs 120 may be configured for public warning system procedures. As shown in FIG. 1, the BS 110a includes a public warning manager 112 that may configure a UE (e.g., the UE 120a) with a monitoring schedule for public warning notifications and transmit public warning notifications according to the monitoring schedule, in accordance with aspects of the present disclosure. The UE 120a includes a public warning manager 122 that monitors public warning notifications according to a monitoring schedule or monitors for a specific signal the indicates whether there is a public warning notification, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
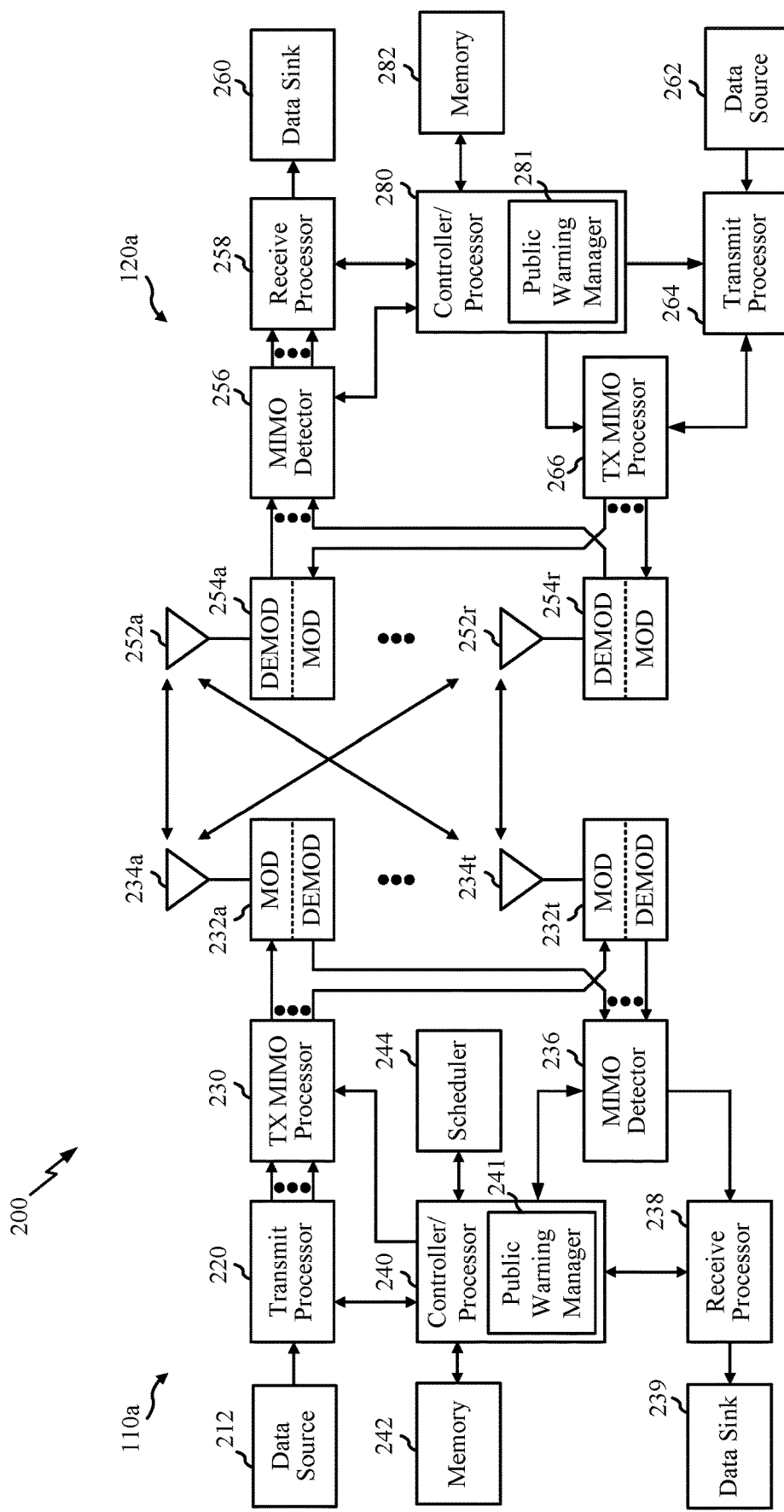
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has public warning manager 241 that may configure a UE (e.g., the UE 120a) with a monitoring schedule for public warning notifications and transmit public warning notifications according to the monitoring schedule, according to aspects described herein. As shown in FIG. 2, the controller/processor 280 of the UE 120a has a public warning manager 281 that monitors public warning notifications according to a monitoring schedule or monitors for a specific signal that indicates whether there is a public warning notification, according to aspects described herein. In certain cases, one of the transceivers 254a-254r may be a dedicated low-power transceiver that is used to monitor for a specific signal that indicates whether there is a public warning notification. For example, the transceiver 254r may be used to monitor for the specific signal that indicates whether there is a public warning notification. In certain cases, the transceiver 254r may be configured to only monitor for the specific signal that indicates whether there is a public warning notification, which may enable desirable power consumption at the UE 120. Although specific managers are shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
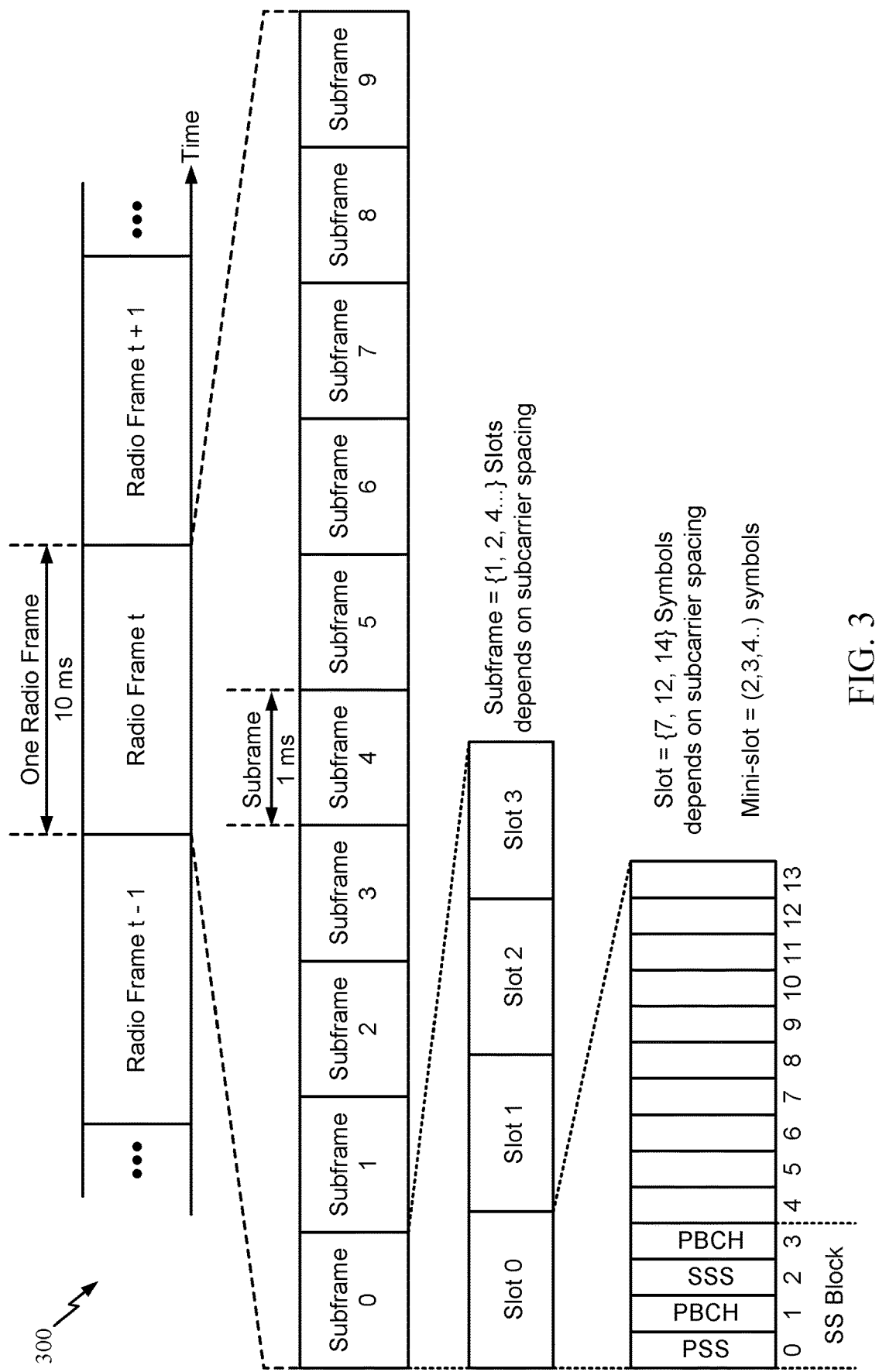
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
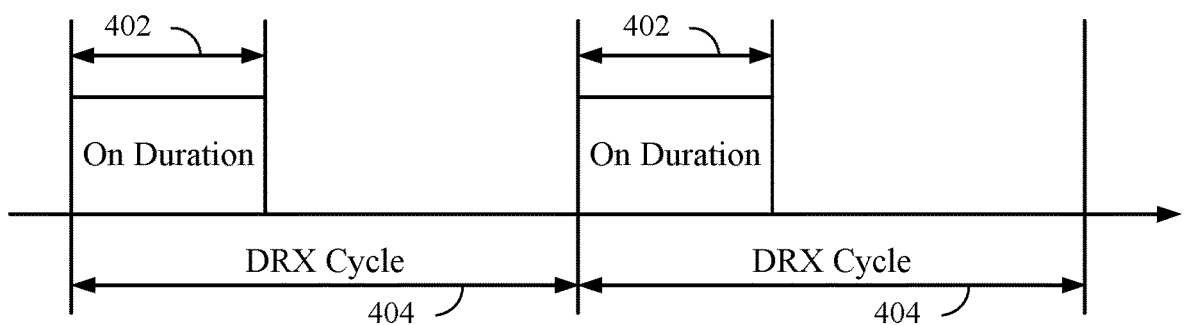
FIG. 4 is a diagram illustrating example Discontinuous Reception (DRX) cycles, in accordance with certain aspects of the present disclosure.

FIG. 4 is a diagram illustrating example Discontinuous Reception (DRX) cycles, in accordance with certain aspects of the present disclosure. The UE may periodically monitor for paging messages from the radio access network (RAN) based on a DRX cycle in connected mode or idle mode. The DRX cycle may provide when the UE has a transceiver powered on to monitor for paging messages and when the UE powers down the transceiver or enters a low power mode. As shown, the UE may have the transceiver powered on during the on-durations 402 to monitor for paging messages from the RAN. The on-durations may be at the beginning of a DRX cycle 404. After the on-durations 402, the UE may power down the transceiver or enter a lower power mode.

In certain cases, the UE may be configured with various DRX cycles, such as a long DRX cycle and a short DRX cycle. The short DRX cycle may be enabled after the UE receives downlink signaling from the RAN during an on-duration, and the short DRX cycle may be disabled after the UE does not receive any pages from the RAN during a short DRX cycle timer.

Example Public Warning System Procedures

In certain wireless communication systems (e.g., UMTS, CDMA, E-UTRA, or 5G NR), a UE may have the capability to receive timely and accurate alerts, warnings and critical information regarding disasters and other emergencies (such as earthquakes, tsunamis, hurricanes, wild fires, or public health emergencies) from the various radio access networks (RANs). For example, the UE may periodically monitor for a public warning notification from the RAN. In certain cases, the UE may monitor for a public warning notification in every DRX cycle, which may be undesirable from a power consumption perspective. Due to the rarity and infrequency of emergencies, most of the power used by a UE to monitor for a public warning notification is wasted.

In certain cases, the UE may monitor for a public warning notification when the UE is connected to a separate wireless network (such as a wireless local area network (WLAN)). That is, the UE may enable its cellular modem every DRX cycle for the public warning notifications while the UE is using a WLAN modem, which may lead to undesirable power consumption at the UE.

In certain cases, the RAN may repeat a public warning notification several times with a certain period of time between two transmissions of the public warning notification. The repetition pattern may be configured by the network operator of the RAN and not known to the UE. In other words, the UE may consume power to monitor for a public warning notification that the UE has already received due to the repetitions, which may lead to undesirable power consumption at the UE.

Aspects of the present disclosure provide various public warning system (PWS) procedures that facilitate desirable power consumption at the UE. The various PWS procedures described herein may enable the UE to reduce the monitoring frequency for public warning notifications, and thus, the UE may consume less power monitoring for public warning notifications, which may provide desirable power consumption at the UE. For instance, the RAN may advertise how often the UE should monitor for a public warning notification. A configurable monitoring schedule at the UE may enable a RAN to implement various monitoring schedules, for example, depending on geographical areas and/or time of day. For example, the RAN may configure the UE to monitor for public warning notifications more frequently during the day and less frequently during the night.

In certain cases, the RAN may transmit a specific signal that indicates whether there is a new public warning notification. In certain aspects, a dedicated channel may be used to transmit the specific signal. Due to the limited information conveyed by the specific signal, the UE may have a separate circuit or module (e.g., the transceiver 254r) dedicated to monitoring the public warning specific signal at a reduced power level, for example, compared to the cellular transceivers.

In certain cases, the RAN may advertise a repetition pattern for public warning notifications to the UE, and the public warning notification may include a notification identifier and a repetition identifier. The repetition pattern along with the identifiers may enable the UE to refrain from monitoring for certain repetitions of a public warning notification once the UE successfully receives a public warning notification within the repetition pattern.

As used herein, a public warning notification may refer to an alert or message that provides information related to an emergency or disaster (such as earthquakes, tsunamis, hurricanes, wild fires, child abduction emergency (e.g., an AMBER alert), an imminent threat, public safety emergency, etc.). The public warning notification may be implemented as the Wireless Emergency Alert (WEA) or the Commercial Mobile Alert System (CMAS) in the United States, the European Union Alert (EU-Alert) in the EU, or the Korean Public Alert System (KPAS) in South Korea, for example.

Figure 5:
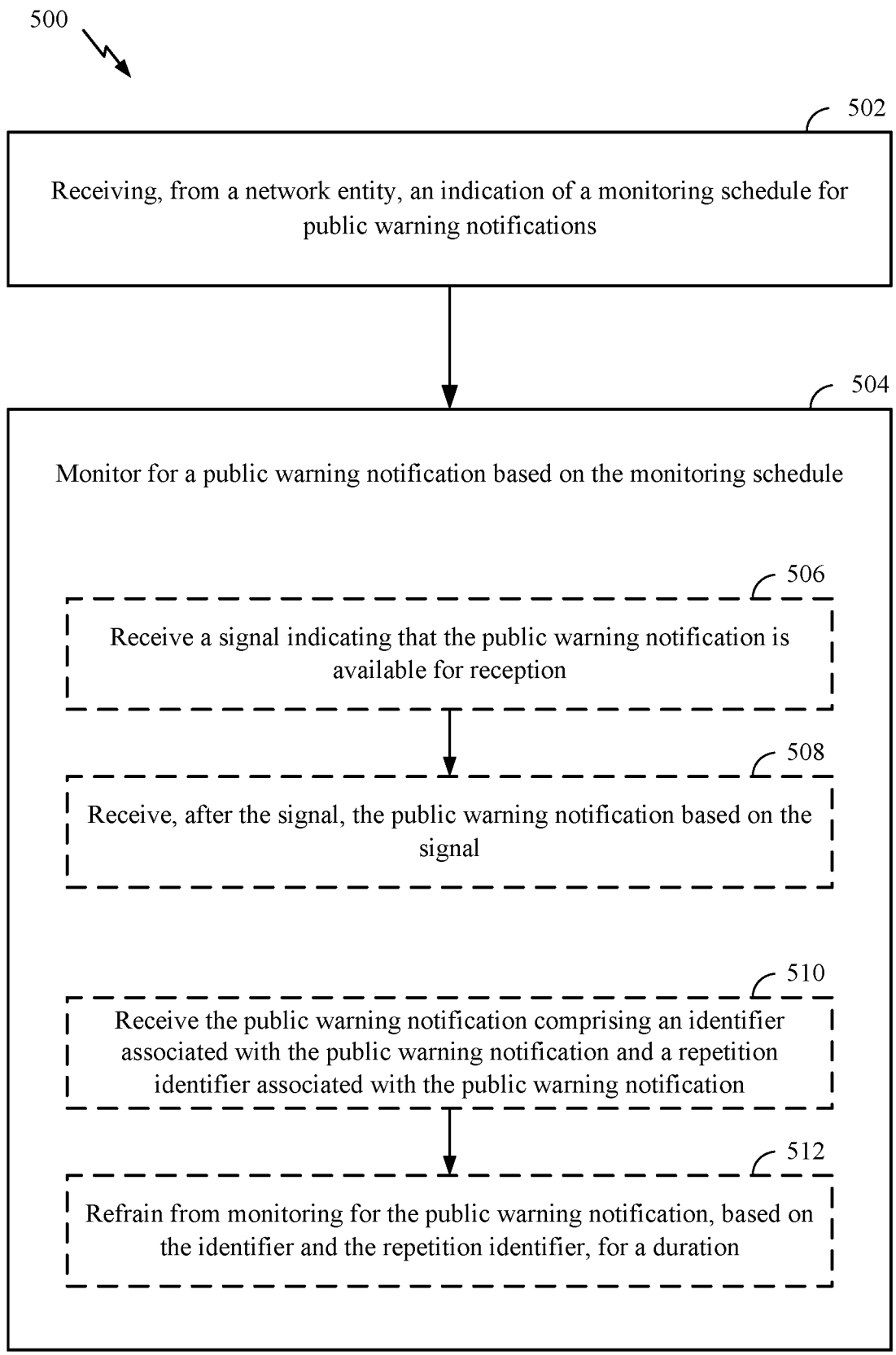
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., the UE 120a in the wireless communication network 100). The operations 500 may be implemented as software components that are executed and run on one or more processors (e.g., controller/processor 280 of FIG. 2). Further, the transmission and reception of signals by the UE in the operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin at 502, where the UE may receive, from a network entity (e.g., the BS 110a), an indication of a monitoring schedule for public warning notifications. At 504, the UE may monitor for a public warning notification based on the monitoring schedule.

In certain aspects, at 502, the UE may receive the indication of the monitoring schedule via various downlink signaling. For example, the downlink signaling carrying the indication of the monitoring schedule may include one or more system information blocks (SIBs), radio resource control (RRC) signaling, downlink control information (DCI), or medium access control (MAC) signaling (e.g., a MAC-control element (MAC-CE)).

In aspects, the indication of the monitoring schedule may indicate the duration of a monitoring occasion for public warning notifications (e.g., similar to the on-duration of a DRX cycle) and the duration of the monitoring cycle for public warning notifications (e.g., similar to a DRX cycle). The duration of the monitoring cycle may provide a period in which the monitoring occasion occurs at the beginning of the monitoring cycle. That is, the monitoring cycle may be periodic similar to a DRX cycle. In aspects, the monitoring schedule may be a separate schedule than the configuration for the DRX cycles. That is, the monitoring schedule for the public warning notifications may include separate monitoring occasions from the monitoring occasions (e.g., the on-durations) of the DRX cycles. For example, the duration of the monitoring occasion for the public warning notifications may be a separate duration from the on-durations of the DRX cycles, and in certain cases, the duration of the monitoring cycle may be a separate duration from the DRX cycle.

In certain aspects, the monitoring occasions for the public warning notifications may be a subset of and overlap with (e.g., start at) the on-durations of the DRX cycles. In certain aspects, the monitoring cycle for public warning notification may include multiple DRX cycles. That is, the monitoring cycle for public warning notifications may be a multiple of a DRX cycle (e.g., two DRX cycles or three DRX cycles). In certain aspects, the monitoring schedule may be indicated relative to (i.e., in terms of) a DRX configuration.

The monitoring schedule may depend on various factors such as geographic area, time of day, time of year (e.g., a certain season), etc. In certain aspects, the monitoring schedule may be configured within a certain area of a wireless communication network. That is, the monitoring schedule may depend on the certain area or geographic location, and the UE may receive, from the RAN, an updated monitoring schedule as the UE moves from one area to another area having a separate monitoring schedule. The area for a monitoring schedule may include a single cell, a plurality of cells, a tracking area, or an entire wireless communications network (e.g., a Public Land Mobile Network (PLMN)). As an example, the UE may receive a monitoring schedule with a higher monitoring frequency in an area with more natural disasters or a higher crime rate than another area with fewer natural disasters or a lower crime rate. In certain aspects, the monitoring schedule may be adjusted seasonally, such as a higher monitoring frequency during hurricane season or winter. In certain aspects, the monitoring frequency may depend on the time of day, such as a lower monitoring frequency during off hours (e.g., nighttime).

In certain aspects, monitoring for the public warning notification at 504 may involve monitoring for a signal indicating that the public warning notification is available for reception. That is, the signal may indicate when the public warning notification will be transmitted. For example, monitoring for the public warning notification at 504 may include the UE receiving, at 506, a signal indicating that the public warning notification is available for reception, and the UE receiving, after the signal, the public warning notification based on the signal at 508. As an example, the UE may monitor for the public warning notification at the next monitoring occasion after receiving the signal. In certain aspects, the UE may be configured with a certain offset from the reception of the signal to monitor for the public warning notification. That is, the UE may implicitly know when to receive the public warning notification based on the configured offset, for example, relative to the when the received the signal. In certain cases, the monitoring schedule may provide the schedule for when the signal at 506 and any subsequent signals are transmitted. For example, the monitoring schedule may correspond to monitoring occasions for the signal. That is, receiving the signal at 506 may include the UE receiving the signal based on the monitoring schedule.

In certain cases, the signal may be a new signal/channel that indicates whether there is a new alert (i.e., public warning notification). Expressed another way, the signal may be a dedicated signal for indicating whether there is a new alert, and in certain cases, the signal may be transmitted on a dedicated channel. That is, the signal may be separate from downlink control signaling such as RRC, DCI, MAC-CE, and/or system information. In certain cases, the signal may have a limited payload such as only having a bit flag indicating whether an alert message is sent or not and/or an identifier associated with the public warning notification (as further described herein). Because the dedicated signal or channel only has the limited payload, the signal may be very simple for the UE to decode, which may facilitate low-power, low complexity circuitry. That is, the dedicated signal may enable the UE to avoid fully decoding and processing a SIB, RRC signaling, DCI, or MAC signaling to determine whether there is a new alert. In certain cases, the UE implementation may use a separate circuit/module (e.g., the transceiver 254r) for monitoring the signal. In such cases, the separate/circuit module may enable the UE to not power up all of the transceivers as in the case of SIB reception (or other downlink signaling such as RRC, DCI, or MAC) and processing, and thus, the UE may consume less power monitoring for the dedicated signal compared to the other downlink signaling.

In certain aspects, the signal at 506 may include an identifier associated with a public warning notification. For example, the identifier may be a sequence number that identifies the public warning notification. In certain cases, the sequence number may be unique for the public warning notification. That is, public warning notifications with the same content may be associated with the same sequence number conveyed in the signal at 506. The identifier may enable the UE to determine whether the UE has already received the alert or not, and the UE may refrain from monitoring for the public warning notification if the identifier in the signal matches the identifier associated with a previously received public warning notification. As used herein, refraining from monitoring may include the UE not powering one or more transceivers for a certain duration to monitor for signals or a public warning notification, and in certain cases, the UE may use the transceivers for other wireless communications during the next monitoring occasion for public warning notification. Receiving the public warning notification at 508 may include the UE receiving the public warning notification based on the identifier in the signal. The identifier may be useful when there are multiple on-going alerts broadcast by the RAN.

For certain aspects, the identifier in the signal may indicate whether a public warning notification is being repeated. For example, monitoring for the public warning notification at 504 may include the UE receiving a first signal indicating that the public warning notification is available for reception and an identifier associated with the public warning notification. The UE may receive, after the first signal (e.g., at a monitoring occasion following the first signal), the public warning notification. At a separate monitoring occasion, the UE may receive a second signal indicating that the public warning notification is available for reception and the identifier (i.e., the same identifier as the first signal), and the UE may refrain from monitoring, after the second signal, for the public warning notification based on the identifier for a duration (e.g., during the monitoring occasion for that particular public warning notification). Thus, the identical identifier in the second signal may enable the UE to reduce the power consumption by skipping the monitoring occasion for the repeated public warning notification as indicated by the second signal.

In certain cases, the identifier may indicate whether a new public warning notification is being sent. For example, monitoring for the public warning notification at 504 may include the UE receiving a first signal indicating that a first public warning notification is available for reception and a first identifier associated with the first public warning notification. The UE may receiving, after the first signal (e.g., at a monitoring occasion following the first signal), the first public warning notification. At a separate monitoring occasion, the UE may receive a second signal indicating that a second public warning notification is available for reception and a second identifier associated with the second public warning notification. The UE may receive, after the second signal (e.g., at a monitoring occasion following the second signal), the second public warning notification based on the second identifier.

In certain cases, the monitoring schedule may indicate a repetition pattern for a public warning notification. For example, the monitoring schedule includes at least one of a number of times the public warning notification is repeated (i.e., how many times an alert is repeated) or a time interval between adjacent repetitions of the public warning notification. In aspects, a public warning notification may include an identifier associated with the public warning notification and a repetition identifier associated with the public warning notification (e.g. $m^{th}$ repetition for alert #n). The identifier associated with the public warning notification may be a sequence number, for example, as described herein with respect to the signal conveying the identifier. The repetition identifier may be a counter for the particular repetition of the public warning notification being transmitted. The identifiers allow the UE to determine how many monitoring occasions for public warning notifications can be skipped, once the UE has successfully received an alert. Thus, the identifiers may effectively lower the monitoring frequency of a UE, providing desirable power consumption.

As an example, monitoring for the public warning notification at 504 may include the UE receiving the public warning notification comprising an identifier associated with the public warning notification and a repetition identifier associated with the public warning notification. The UE may refrain from monitoring for the public warning notification, based on the identifier and the repetition identifier, for a duration (e.g., at monitoring occasion(s) for one or more repetitions).

Figure 6:
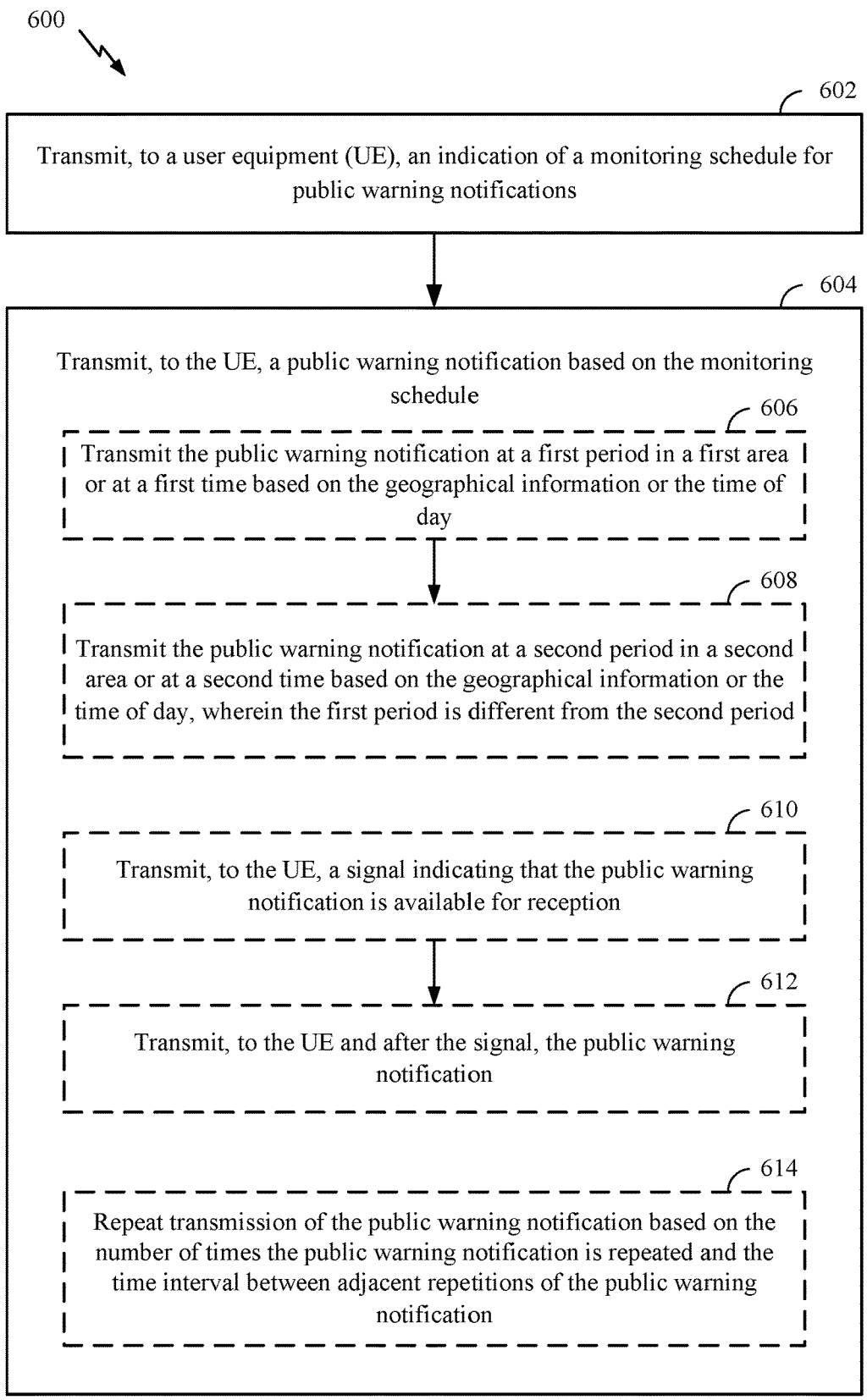
FIG. 6 is a flow diagram illustrating example operations for wireless communication by a network entity, in accordance with certain aspects of the present disclosure.

FIG. 6 is a flow diagram illustrating example operations 600 for wireless communication, in accordance with certain aspects of the present disclosure. The operations 600 may be performed, for example, by a network entity (e.g., the BS 110a in the wireless communication network 100). The operations 600 may be complimentary to the operations 500 performed by the UE. The operations 600 may be implemented as software components that are executed and run on one or more processors (e.g., controller/processor 240 of FIG. 2). Further, the transmission and reception of signals by the network entity in the operations 600 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, a network entity may refer to a wireless communication device (such as a cell, base station, access point, or relay station) in a wireless communication network (e.g., a RAN).

The operations 600 may begin at 602, where the network entity may transmit, to a user equipment (UE), an indication of a monitoring schedule for public warning notifications. At 604, the network entity may transmit, to the UE, a public warning notification based on the monitoring schedule.

The indication of the monitoring schedule may indicate the duration of a monitoring occasion for public warning notifications and the duration of the monitoring cycle for public warning notifications, for example as described herein with respect to the operations 500.

In aspects, the monitoring schedule may depend on various factors such as geographic area, time of day, time of year (e.g., a certain season), etc., for example, as described herein with respect to the operations 500. As an example, transmitting the public warning notification at 604 may include the network entity, at 606, transmitting the public warning notification at a first period (i.e., the duration of the monitoring cycle) in a first area or at a first time based on the geographical information or the time of day. At 608, the network entity may transmit the public warning notification at a second period in a second area or at a second time based on the geographical information or the time of day. In aspects, the first period (e.g., 5 seconds) may be different from the second period (e.g., 10 seconds). In certain aspects, the various monitoring schedules may be configured across multiple cells in a wireless communication network. That is, a first cell or network entity may be configured with a first period for transmitting the public warning notification, and a second cell or network entity may be configured with a second period for transmitting the public warning notification.

In certain aspects, transmitting the public warning notification at 604 may involve transmitting a signal indicating that the public warning notification is available for reception before transmitting the public warning notification, for example, as described herein with respect to the operations 500 (e.g., at 506 and 508). As an example, transmitting the public warning notification at 604 may include the network entity, at 610, transmitting, to the UE, a signal indicating that the public warning notification is available for reception. At 612, the network entity may transmit, to the UE and after the signal (e.g., at a monitoring occasion after transmitting the signal), the public warning notification.

In certain aspects, the signal at 606 may include an identifier associated with a public warning notification, for example, as described herein with respect to the operations 500. As an example, the identifier in the signal may indicate whether a public warning notification is being repeated. Transmitting the public warning notification at 604 may include the network entity transmitting a first signal indicating that the public warning notification is available for reception and an identifier associated with the public warning notification. The network entity may transmit, after the first signal (e.g., at a monitoring occasion after the first signal), the public warning notification. At a separate monitoring occasion, the network entity may transmit a second signal indicating that the public warning notification is available for reception and the identifier (i.e., the same identifier at the first signal), and the network entity may transmit, after the second signal (e.g., at a monitoring occasion after the second signal), the public warning notification.

In certain cases, the identifier may indicate whether a new public warning notification is being sent. For example, transmitting the public warning notification at 604 may include the network entity transmitting a first signal indicating that a first public warning notification is available for reception and a first identifier associated with the first public warning notification. The network entity may transmit, after the first signal (e.g., at a monitoring occasion after transmission of the first signal), the first public warning notification. At a separate monitoring occasion, the network entity may transmit a second signal indicating that a second public warning notification is available for reception and a second identifier associated with the second public warning notification. The network entity may transmit, after the second signal (e.g., at a monitoring occasion after transmission of the second signal), the second public warning notification.

In certain aspects, the monitoring schedule may indicate a repetition pattern for a public warning notification, for example, as described herein with respect to the operations 500. For instance, the monitoring schedule may include at least one of a number of times the public warning notification is repeated or a time interval between adjacent repetitions of the public warning notification. As an example, transmitting the public warning notification at 604 may include the network entity repeating transmission of the public warning notification based on the number of times the public warning notification is repeated and the time interval between adjacent repetitions of the public warning notification.

Figure 7:
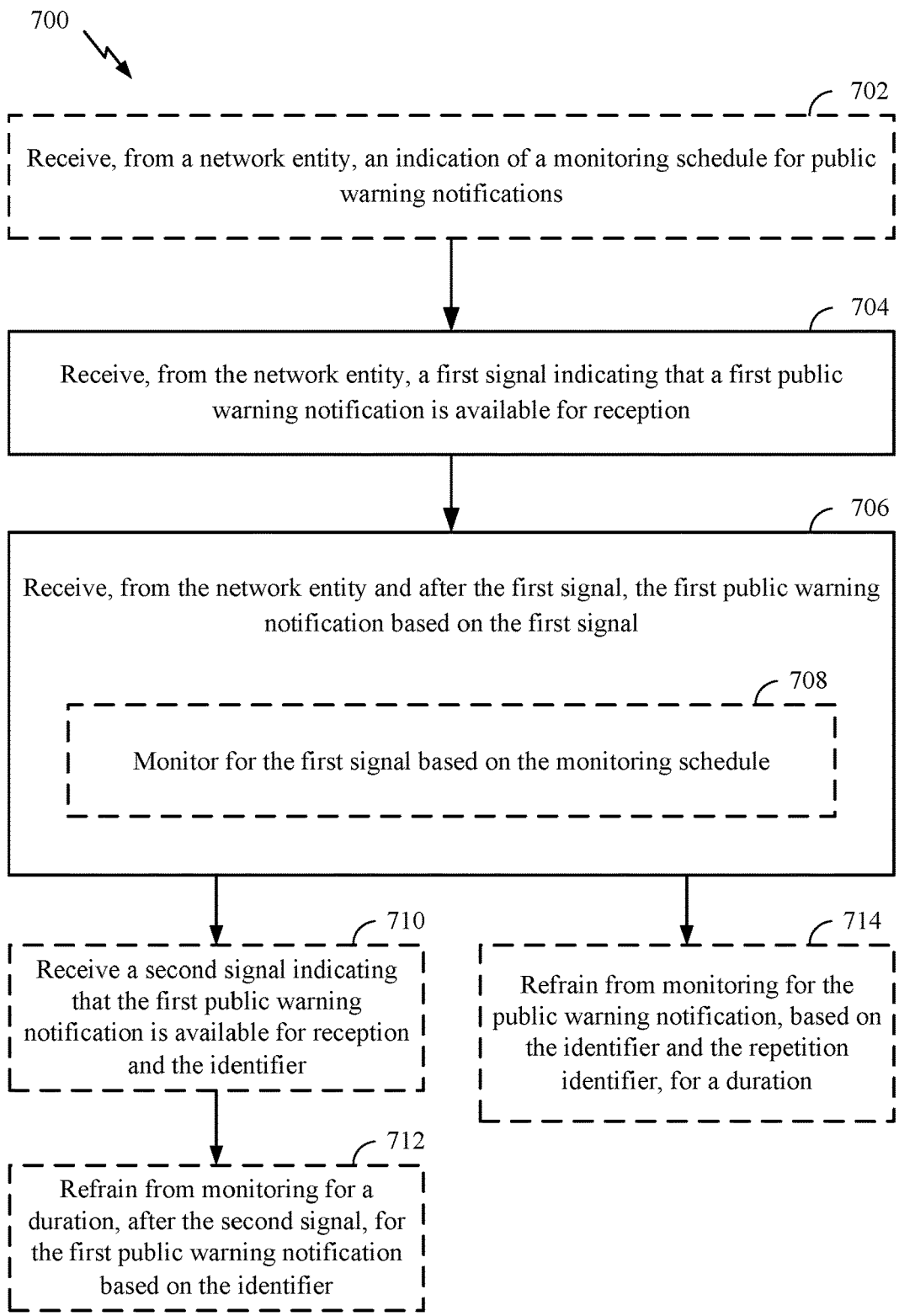
FIG. 7 is a flow diagram illustrating other example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., the UE 120*a* in the wireless communication network 100). The operations 700 may be implemented as software components that are executed and run on one or more processors (e.g., controller/processor 280 of FIG. 2). Further, the transmission and reception of signals by the UE in the operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may optionally begin at 702, where the UE may receive, from a network entity (e.g., the BS 110*a*), an indication of a monitoring schedule for public warning notifications. At 704, the UE may receive, from the network entity, a first signal indicating that a first public warning notification is available for reception. In certain aspects, the UE may receive, at 708, the first signal based on the monitoring schedule. At 706, the UE may receive, from the network entity and after the first signal (e.g., at a monitoring occasion following the first signal), the first public warning notification based on the first signal. In certain cases, the operations 700 may begin at 704.

In aspects, receiving the first signal at 704 may involve receiving a signal as described herein with respect to the operations 500. For example, the first signal may further indicate a first identifier associated with the first public warning notification. In aspects, receiving the first public warning notification at 706 may comprise the UE receiving the first public warning notification based on the identifier.

In certain cases, the identifier in the signal may indicate whether a public warning notification is being repeated. For example, the operations 700 may further include the UE receiving, at 710, a second signal indicating that the first public warning notification is available for reception and the identifier (i.e., the same identifier as the first signal). In aspects, the second signal may be received at a separate monitoring occasion from when the first signal is received. At 712, the UE may refrain from monitoring, after the second signal, for the first public warning notification based on the identifier for a duration (e.g., during the monitoring occasion for that particular public warning notification).

In certain cases, the identifier may indicate whether a new public warning notification is being sent. For example, the operations 700 may further include the UE receiving a second signal indicating that a second public warning notification is available for reception and a second identifier associated with the second public warning notification. The UE may receive, after the second signal (e.g., at a monitoring occasion following the second signal), the second public warning notification based on the second identifier.

In certain aspects, the UE may receive the first signal at 704 based on the monitoring schedule received at 702, for example, as described herein with respect to the operations 500. In certain aspects, the monitoring schedule may indicate a repetition pattern for a public warning notification, for example, as described herein with respect to the operations 500. As an example, the monitoring schedule may include at least one of a number of times the first public warning notification is repeated or a time interval between adjacent repetitions of the first public warning notification. In certain cases, the first public warning notification may include an identifier associated with the public warning notification and a repetition identifier associated with the public warning notification, and operations 700 may further include the UE refraining, at 714, from monitoring for the public warning notification, based on the identifier and the repetition identifier, for a duration (e.g., at monitoring occasion(s) for one or more repetitions).

Figure 8:
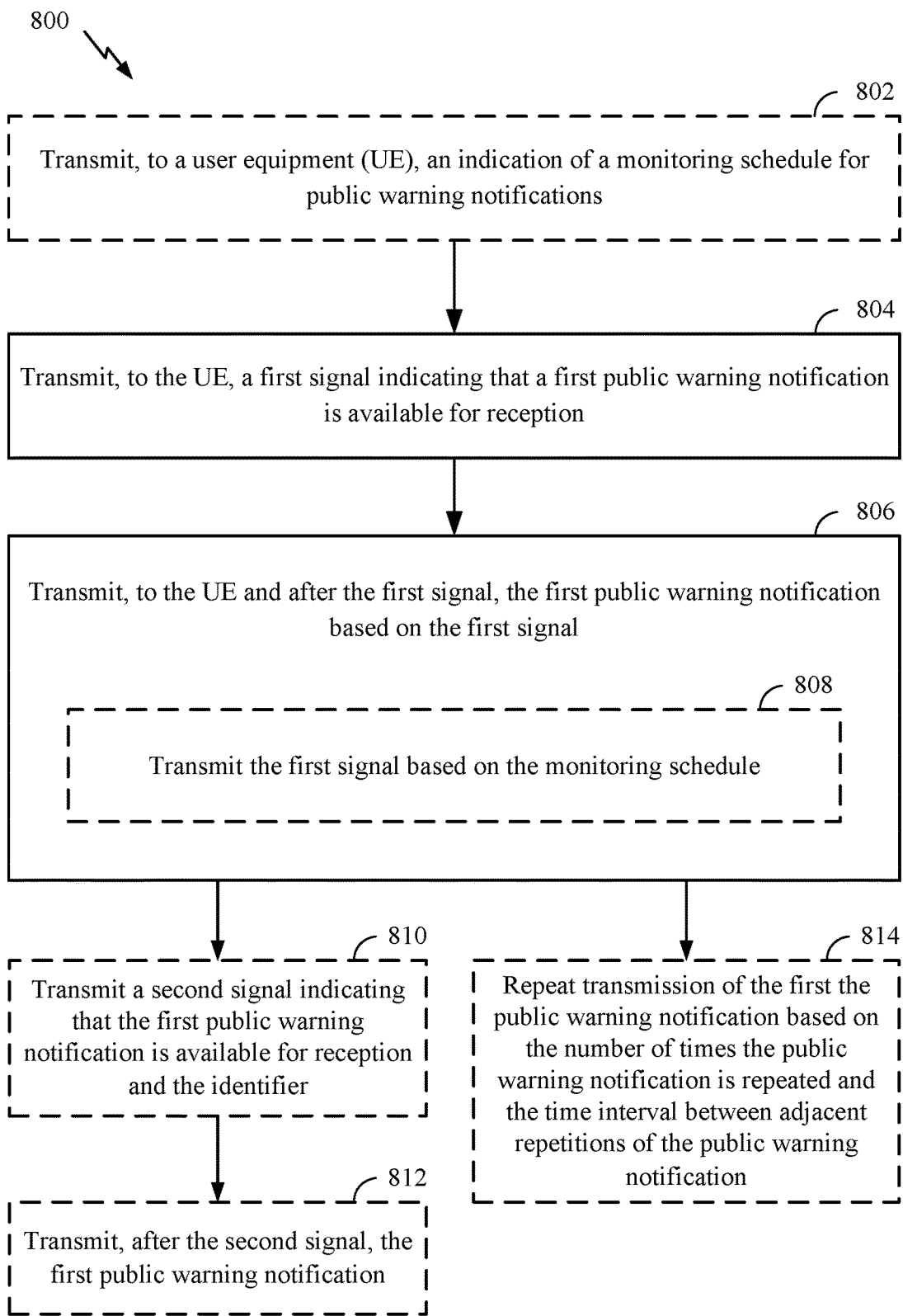
FIG. 8 is a flow diagram illustrating other example operations for wireless communication by a network entity, in accordance with certain aspects of the present disclosure.

FIG. 8 is a flow diagram illustrating example operations 800 for wireless communication, in accordance with certain aspects of the present disclosure. The operations 800 may be performed, for example, by a network entity (e.g., the BS 110*a* in the wireless communication network 100). The operations 800 may be complimentary to the operations 700 performed by the UE. The operations 800 may be implemented as software components that are executed and run on one or more processors (e.g., controller/processor 240 of FIG. 2). Further, the transmission and reception of signals by the network entity in the operations 800 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

The operations 800 may optionally begin at 802, where the network entity may transmit, to a UE (e.g., the UE 120*a*), an indication of a monitoring schedule for public warning notifications. At 804, the network entity may transmit, to a user equipment (UE), a first signal indicating that a first public warning notification is available for reception. In certain aspects, the network entity may transmit, at 808, the first signal based on the monitoring schedule. At 806, the network entity may transmit, to the UE and after the first signal, the first public warning notification based on the first signal.

In certain aspects, the first signal at 804 may include an identifier associated with a public warning notification, for example, as described herein with respect to the operations 500. In certain cases, the identifier in the signal may indicate whether a public warning notification is being repeated. For example, the operations 800 may further include the network entity transmitting, at 810, a second signal indicating that the first public warning notification is available for reception and the identifier (i.e., the same identifier at the first signal). At 812, the network entity may transmit, after the second signal (e.g., at a monitoring occasion after the second signal), the first public warning notification.

In certain cases, the identifier may indicate whether a new public warning notification is being sent. For example, the operations may further include the network entity transmitting a second signal indicating that a second public warning notification is available for reception and a second identifier associated with the second public warning notification. The network entity may transmit, after the second signal (e.g., at a monitoring occasion after the second signal), the second public warning notification.

In certain aspects, the first signal and/or the second signal may be transmitted based on the monitoring schedule, for example, as described herein with respect to the operations 500. In aspects, the monitoring schedule may depend on various factors such as geographic area, time of day, time of year (e.g., a certain season), etc., for example, as described herein with respect to the operations 500. As an example, the monitoring schedule may depend on at least one of geographical information or a time of day. In certain cases, transmitting the first signal at 704 may include the network entity transmitting the first signal at a first period in a first area or at first time based on the geographical information or the time of day. The network entity may transmit the first signal at a second period in a second area or at a second time based on the geographical information or the time of day, where the first period is different from the second period.

In certain aspects, the monitoring schedule may indicate a repetition pattern for a public warning notification, for example, as described herein with respect to the operations 500. For example, the monitoring schedule may include at least one of a number of times the public warning notification is repeated or a time interval between adjacent repetitions of the public warning notification. The operations 800 may further include the network entity repeating, at 814, transmission of the first the public warning notification based on the number of times the public warning notification is repeated and the time interval between adjacent repetitions of the public warning notification.

Figure 9:
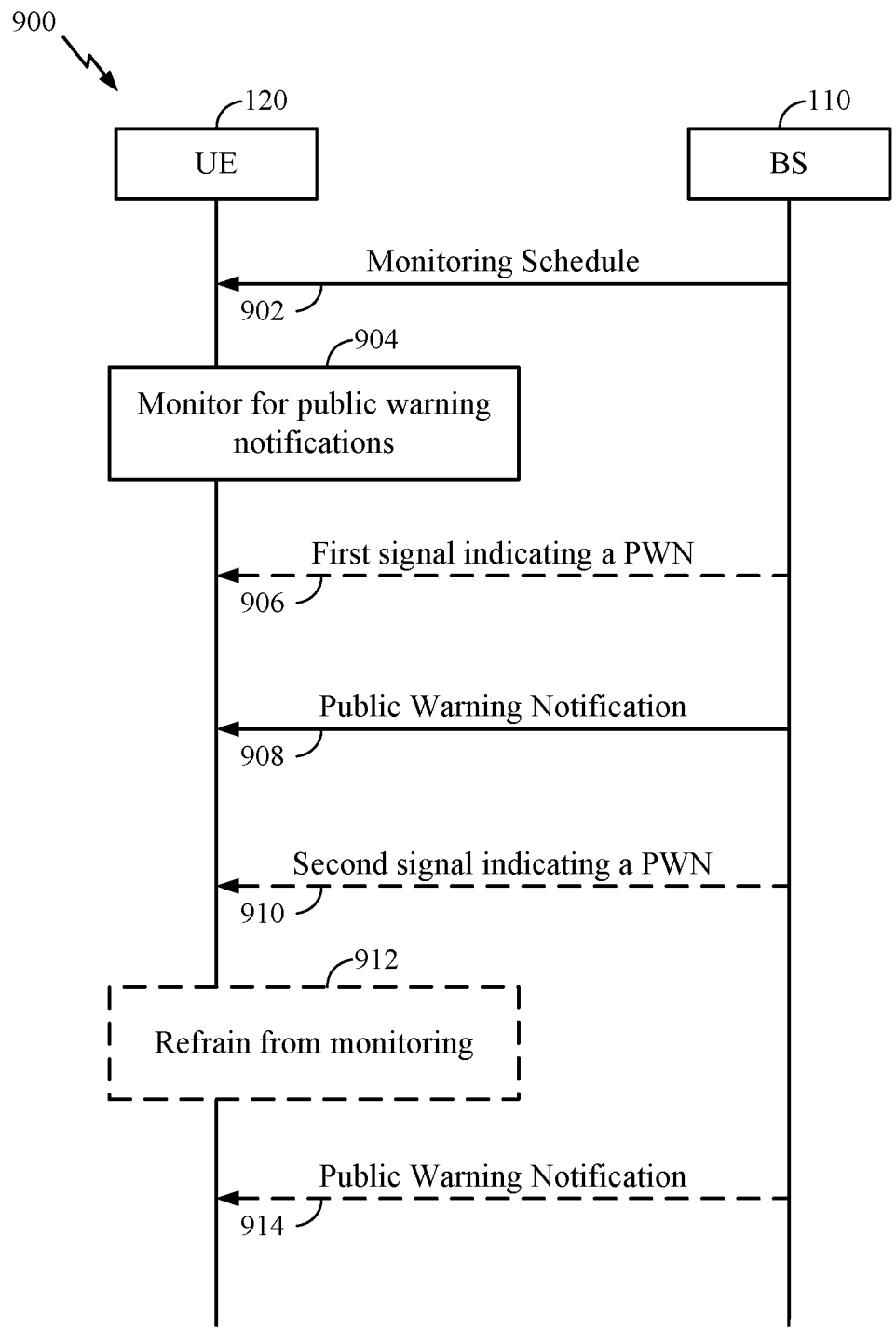
FIG. 9 is a signaling flow diagram illustrating example operations for scheduling/monitoring for a public warning notification, in accordance with aspects of the present disclosure.

FIG. 9 is a signaling flow illustrating example operations for scheduling/monitoring for a public warning notification, in accordance with certain aspects of the present disclosure. As shown, the UE 120 may receive, from the BS 110, an indication 902 of a monitoring schedule for public warning notifications. The monitoring schedule may provide a duration of a monitoring occasion for public warning notifications and the duration of the monitoring cycle for public warning notifications, for example, as described herein with respect to the operations 500. At 904, the UE 120 may monitor for public warning notifications according to the monitoring schedule. For example, the UE may power on a transceiver (e.g., the transceiver 254*r*) at the monitoring occasions of the monitoring schedule to monitor for public warning notifications and/or signals that indicate a public warning notification is available for reception.

Optionally, the UE 120 may receive, from the BS 110, a first signal 906 indicating that a public warning notification is available for reception. In certain cases, the first signal may include an identifier associated with the public warning notification. In certain aspects, the UE 120 may monitor for the first signal based on the monitoring schedule.

The UE 120 may receive, from the BS 110, a public warning notification 908 based on the monitoring schedule or the first signal 906. For example, the UE 120 may receive the public warning notification 908 during a monitoring occasion in accordance with the monitoring schedule. In certain cases, reception of the first signal 906 may trigger the UE 120 to monitor for the public warning notification 908 at a certain monitoring occasion, for example, the next monitoring occasion after the first signal. In certain aspects, the public warning notification may include an identifier associated with the public warning notification and a repetition identifier associated with the public warning notification.

Optionally, the UE 120 may receive, from the BS 110, a second signal 910 indicating a public warning notification is available for reception. In certain cases, the second signal 910 may include an identifier associated with the public warning notification. In certain cases, the identifier of the second signal 910 may be different from the identifier of the first signal 906.

Optionally, at 912, the UE 120 may refrain from monitoring for a public warning notification, for example, based on the identifier of the second signal or the identifier of the public warning notification 908 and the repetition identifier. For example, the second signal may indicate that the next public warning notification is the same as the public warning notification 908 via the identifier, and the UE 120 may refrain from monitoring for the next public warning notification based on the identifier. As another example, the public warning notification 908 may include the identifier associated with the public warning notification and the repetition identifier, and the UE 120 may refrain from monitoring for the next public warning notification due to the repetition pattern of the public warning notifications.

In certain cases, the UE 120 may receive, from the BS 110, a public warning notification 914 based on the second signal 910 or the monitoring schedule. For example, suppose the identifier of the second signal 910 is different from the identifier of the first signal 906. The UE 120 may receive the public warning notification 914 based on the identifier of the second signal 910 being different from the identifier of the first signal 906. That is, the UE 120 may determine that the public warning notification 914 associated with the second signal is a new alert and separate from the public warning notification 908.

Figure 10:
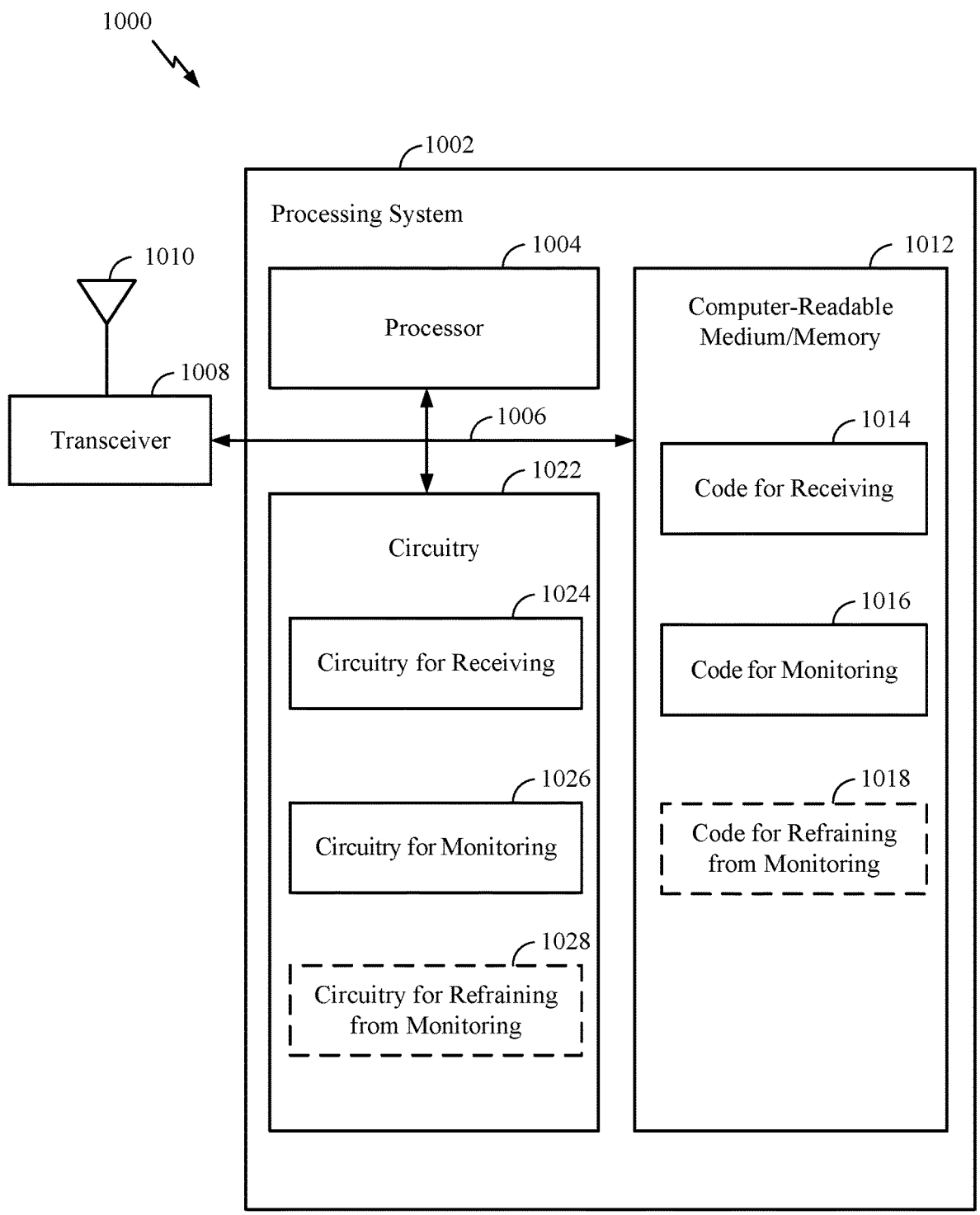
FIG. 10 illustrates a communications device (e.g., a UE) that may include various components configured to perform operations for the techniques disclosed herein in accordance with aspects of the present disclosure.

FIG. 10 illustrates a communications device 1000 (e.g., the UE 120) that may include various components (e.g., corresponding to means-plus-function components) configured to perform operations for the techniques disclosed herein, such as the operations illustrated in FIGS. 5 and 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 5 and 7, or other operations for performing the various techniques discussed herein for monitoring/scheduling of public warning notifications. In certain aspects, computer-readable medium/memory 1012 stores code for receiving 1014, code for monitoring 1016, and/or code for refraining from monitoring 1018. In certain aspects, the processing system 1002 has circuitry 1022 configured to implement the code stored in the computer-readable medium/memory 1012. In certain aspects, the circuitry 1022 is coupled to the processor 1004 and/or the computer-readable medium/memory 1012 via the bus 1006. For example, the circuitry 1022 includes circuitry for receiving 1024, circuitry for monitoring 1026, and/or circuitry for refraining from monitoring 1028.

Figure 11:
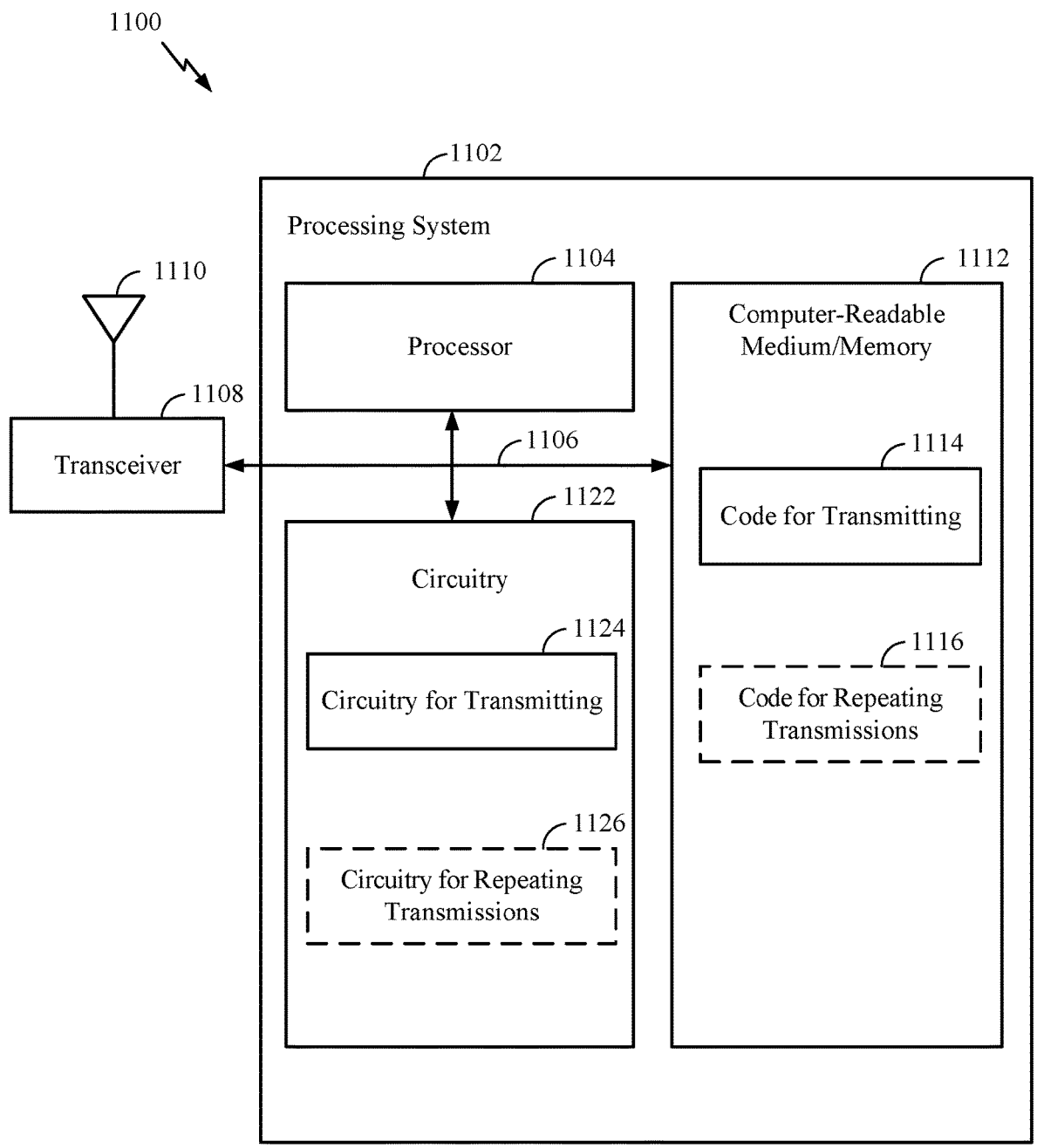
FIG. 11 illustrates a communications device (e.g., a BS) that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 6 and 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 6 and 8, or other operations for performing the various techniques discussed herein for transmitting/scheduling of public warning notifications. In certain aspects, computer-readable medium/memory 1112 stores code for transmitting 1114 and/or code for repeating transmissions 1116. In certain aspects, the processing system 1102 has circuitry 1122 configured to implement the code stored in the computer-readable medium/memory 1112. In certain aspects, the circuitry 1122 is coupled to the processor 1104 and/or the computer-readable medium/memory 1112 via the bus 1106. For example, the circuitry 1122 includes circuitry for transmitting 1124 and/or circuitry for repeating transmissions 1126.

Example Aspects

In addition to the various aspects described above, specific combinations of aspects are within the scope of the disclosure, some of which are detailed below:

Aspect 1. An apparatus for wireless communication, comprising a memory; and a processor coupled to the memory, the processor and the memory being configured to receive, from a network entity, an indication of a monitoring schedule for public warning notifications, and monitor for a public warning notification based on the monitoring schedule.

Aspect 2. The apparatus of Aspect 1, wherein the processor and the memory are further configured to receive a signal indicating that the public warning notification is available for reception, and receive, after the signal, the public warning notification based on the signal.

Aspect 3. The apparatus of Aspect 2, wherein the signal further indicates an identifier associated with the public warning notification, and the processor and the memory are further configured to receive the public warning notification based on the identifier.

Aspect 4. The apparatus according to any of Aspects 2 or 3, wherein the processor and the memory are further configured to receive the signal based on the monitoring schedule.

Aspect 5. The apparatus according to any of Aspects 1 or 4, wherein the processor and the memory are further configured to receive a first signal indicating that the public warning notification is available for reception and an identifier associated with the public warning notification; receive, after the first signal, the public warning notification; receive a second signal indicating that the public warning notification is available for reception and the identifier; and refrain from monitoring, after the second signal, for the public warning notification based on the identifier for a duration.

Aspect 6. The apparatus according to any of Aspects 1 or 4, wherein the processor and the memory are further configured to receive a first signal indicating that a first public warning notification is available for reception and a first identifier associated with the first public warning notification; receive, after the first signal, the first public warning notification; receive a second signal indicating that a second public warning notification is available for reception and a second identifier associated with the second public warning notification; and receive, after the second signal, the second public warning notification based on the second identifier.

Aspect 7. The apparatus according to any of Aspects 1-6, wherein the monitoring schedule includes at least one of a number of times the public warning notification is repeated or a time interval between adjacent repetitions of the public warning notification.

Aspect 8. The apparatus of Aspect 7, wherein the processor and the memory are further configured to: receive the public warning notification comprising an identifier associated with the public warning notification and a repetition identifier associated with the public warning notification, and refrain from monitoring for the public warning notification, based on the identifier and the repetition identifier, for a duration.

Aspect 9. An apparatus for wireless communication, comprising: a memory; and a processor coupled to the memory, the processor and the memory being configured to: transmit, to a user equipment (UE), an indication of a monitoring schedule for public warning notifications, and transmit, to the UE, a public warning notification based on the monitoring schedule.

Aspect 10. The apparatus of Aspect 9, wherein the monitoring schedule depends on at least one of geographical information or a time of day.

Aspect 11. The apparatus of Aspect 10, wherein the processor and the memory are further configured to: transmit the public warning notification at a first period in a first area or at a first time based on the geographical information or the time of day, and transmit the public warning notification at a second period in a second area or at a second time based on the geographical information or the time of day, wherein the first period is different from the second period.

Aspect 12. The apparatus according to any of Aspects 9-11, wherein the processor and the memory are further configured to: transmit, to the UE, a signal indicating that the public warning notification is available for reception; and transmit, to the UE and after the signal, the public warning notification.

Aspect 13. The apparatus of Aspect 12, wherein the signal further indicates an identifier associated with the public warning notification.

Aspect 14. The apparatus according to any of Aspects 9-11, wherein the processor and the memory are further configured to: transmit a first signal indicating that the public warning notification is available for reception and an identifier associated with the public warning notification, transmit, after the first signal, the public warning notification, transmit a second signal indicating that the public warning notification is available for reception and the identifier, and transmit, after the second signal, the public warning notification.

Aspect 15. The apparatus according to any of Aspects 9-11, wherein the processor and the memory are further configured to: transmit a first signal indicating that a first public warning notification is available for reception and a first identifier associated with the first public warning notification, transmit, after the first signal, the first public warning notification, transmitting a second signal indicating that a second public warning notification is available for reception and a second identifier associated with the second public warning notification, and transmit, after the second signal, the second public warning notification.

Aspect 16. The apparatus according to any of Aspects 9-15, wherein: the monitoring schedule includes at least one of a number of times the public warning notification is repeated or a time interval between adjacent repetitions of the public warning notification, and the processor and the memory are further configured to repeat transmission of the public warning notification based on the number of times the public warning notification is repeated and the time interval between adjacent repetitions of the public warning notification.

Aspect 17. An apparatus for wireless communication, comprising: a memory; and a processor coupled to the memory, the processor and the memory being configured to: receive, from a network entity, a first signal indicating that a first public warning notification is available for reception, and receive, from the network entity and after the first signal, the first public warning notification based on the first signal.

Aspect 18. The apparatus of Aspect 17, wherein: the first signal further indicates a first identifier associated with the first public warning notification; and the processor and the memory are further configured to receive the first public warning notification based on the identifier.

Aspect 19. The apparatus of Aspect 18, wherein the processor and the memory are further configured to: receive a second signal indicating that the first public warning notification is available for reception and the identifier; and refrain from monitoring, after the second signal, for the first public warning notification based on the identifier for a duration.

Aspect 20. The apparatus of Aspect 18, wherein the processor and the memory are further configured to: receive a second signal indicating that a second public warning notification is available for reception and a second identifier associated with the second public warning notification, and receive, after the second signal, the second public warning notification based on the second identifier.

Aspect 21. The apparatus according to any of Aspects 17-20, wherein the processor and the memory are further configured to: receive, from the network entity, an indication of a monitoring schedule for public warning notifications, and receive the first signal comprises monitoring for the first signal based on the monitoring schedule.

Aspect 22. The apparatus of Aspect 21, wherein the monitoring schedule includes at least one of a number of times the first public warning notification is repeated or a time interval between adjacent repetitions of the first public warning notification.

Aspect 23. The apparatus according to any of Aspects 21 or 22, wherein: the first public warning notification comprises an identifier associated with the public warning notification and a repetition identifier associated with the public warning notification; and the processor and the memory are further configured to refrain from monitoring for the public warning notification, based on the identifier and the repetition identifier, for a duration.

Aspect 24. An apparatus for wireless communication, comprising: a memory; and a processor coupled to the memory, the processor and the memory being configured to: transmit, to a user equipment (UE), a first signal indicating that a first public warning notification is available for reception, and transmit, to the UE and after the first signal, the first public warning notification based on the first signal.

Aspect 25. The apparatus of Aspect 24, wherein the first signal further indicates a first identifier associated with the first public warning notification.

Aspect 26. The apparatus of Aspect 25, wherein the processor and the memory are further configured to: transmit a second signal indicating that the first public warning notification is available for reception and the identifier, and transmit, after the second signal, the first public warning notification.

Aspect 27. The apparatus of Aspect 25, wherein the processor and the memory are further configured to: transmit a second signal indicating that a second public warning notification is available for reception and a second identifier associated with the second public warning notification, and transmit, after the second signal, the second public warning notification.

Aspect 28. The apparatus according to any of Aspects 24-27, wherein the processor and the memory are further configured to: transmit, to the UE, an indication of a monitoring schedule for public warning notifications, and transmit the first signal comprises transmitting the first signal based on the monitoring schedule.

Aspect 29. The apparatus of Aspect 28, wherein: the monitoring schedule depends on at least one of geographical information or a time of day; and the processor and the memory are further configured to: transmit the first signal at a first period in a first area or at first time based on the geographical information or the time of day, and transmit the first signal at a second period in a second area or at a second time based on the geographical information or the time of day, wherein the first period is different from the second period.

Aspect 30. The apparatus according to any of Aspects 28 or 29, wherein: the monitoring schedule includes at least one of a number of times the public warning notification is repeated or a time interval between adjacent repetitions of the public warning notification; and the processor and the memory are further configured to repeat transmission of the first the public warning notification based on the number of times the public warning notification is repeated and the time interval between adjacent repetitions of the public warning notification.

Aspect 31. A method of wireless communication by a user equipment, comprising: receiving, from a network entity, an indication of a monitoring schedule for public warning notifications; and monitoring for a public warning notification based on the monitoring schedule.

Aspect 32. The method of Aspect 31, wherein monitoring for the public warning notification comprises: receiving a signal indicating that the public warning notification is available for reception; and receiving, after the signal, the public warning notification based on the signal.

Aspect 33. The method of Aspect 32, wherein: the signal further indicates an identifier associated with the public warning notification; and receiving the public warning notification comprises receiving the public warning notification based on the identifier.

Aspect 34. The method according to any of Aspects 32 or 33, wherein receiving the signal comprises receiving the signal based on the monitoring schedule.

Aspect 35. The method according to any of Aspects 31-34, wherein monitoring for the public warning notification comprises: receiving a first signal indicating that the public warning notification is available for reception and an identifier associated with the public warning notification; receiving, after the first signal, the public warning notification; receiving a second signal indicating that the public warning notification is available for reception and the identifier; and refraining from monitoring, after the second signal, for the public warning notification based on the identifier for a duration.

Aspect 36. The method according to any of Aspects 31-34, wherein monitoring for the public warning notification comprises: receiving a first signal indicating that a first public warning notification is available for reception and a first identifier associated with the first public warning notification; receiving, after the first signal, the first public warning notification; receiving a second signal indicating that a second public warning notification is available for reception and a second identifier associated with the second public warning notification; and receiving, after the second signal, the second public warning notification based on the second identifier.

Aspect 37. The method according to any of Aspects 31-36, wherein the monitoring schedule includes at least one of a number of times the public warning notification is repeated or a time interval between adjacent repetitions of the public warning notification.

Aspect 38. The method of Aspect 37, wherein monitoring for the public warning notification comprises: receiving the public warning notification comprising an identifier associated with the public warning notification and a repetition identifier associated with the public warning notification; and refraining from monitoring for the public warning notification, based on the identifier and the repetition identifier, for a duration.

Aspect 39. A method of wireless communication by a network entity, comprising: transmitting, to a user equipment (UE), an indication of a monitoring schedule for public warning notifications; and transmitting, to the UE, a public warning notification based on the monitoring schedule.

Aspect 40. The method of Aspect 39, wherein the monitoring schedule depends on at least one of geographical information or a time of day.

Aspect 41. The method of Aspect 40, wherein transmitting the public warning notification comprises: transmitting the public warning notification at a first period in a first area or at a first time based on the geographical information or the time of day; and transmitting the public warning notification at a second period in a second area or at a second time based on the geographical information or the time of day, wherein the first period is different from the second period.

Aspect 42. The method according to any of Aspects 39-41, wherein transmitting the public warning notification comprises: transmitting, to the UE, a signal indicating that the public warning notification is available for reception; and transmitting, to the UE and after the signal, the public warning notification.

Aspect 43. The method of Aspect 42, wherein the signal further indicates an identifier associated with the public warning notification.

Aspect 44. The method according to any of Aspects 39-41, wherein transmitting the public warning notification comprises: transmitting a first signal indicating that the public warning notification is available for reception and an identifier associated with the public warning notification; transmitting, after the first signal, the public warning notification; transmitting a second signal indicating that the public warning notification is available for reception and the identifier; and transmitting, after the second signal, the public warning notification.

Aspect 45. The method according to any of Aspects 39-41, wherein transmitting the public warning notification comprises: transmitting a first signal indicating that a first public warning notification is available for reception and a first identifier associated with the first public warning notification; transmitting, after the first signal, the first public warning notification; transmitting a second signal indicating that a second public warning notification is available for reception and a second identifier associated with the second public warning notification; and transmitting, after the second signal, the second public warning notification.

Aspect 46. The method according to any of Aspects 39-45, wherein the monitoring schedule includes at least one of a number of times the public warning notification is repeated or a time interval between adjacent repetitions of the public warning notification.

Aspect 47. The method of Aspect 46, wherein transmitting the public warning notification comprises: repeating transmission of the public warning notification based on the number of times the public warning notification is repeated and the time interval between adjacent repetitions of the public warning notification.

Aspect 48. A method of wireless communication by a user equipment, comprising: receiving, from a network entity, a first signal indicating that a first public warning notification is available for reception; and receiving, from the network entity and after the first signal, the first public warning notification based on the first signal.

Aspect 49. The method of Aspect 48, wherein: the first signal further indicates a first identifier associated with the first public warning notification; and receiving the first public warning notification comprises receiving the first public warning notification based on the identifier.

Aspect 50. The method of Aspect 49, further comprising: receiving a second signal indicating that the first public warning notification is available for reception and the identifier; and refraining from monitoring, after the second signal, for the first public warning notification based on the identifier for a duration.

Aspect 51. The method of Aspect 49, further comprising: receiving a second signal indicating that a second public warning notification is available for reception and a second identifier associated with the second public warning notification; and receiving, after the second signal, the second public warning notification based on the second identifier.

Aspect 52. The method according to any of Aspects 48-51, further comprising: receiving, from the network entity, an indication of a monitoring schedule for public warning notifications; receiving the first signal comprises monitoring for the first signal based on the monitoring schedule.

Aspect 53. The method of Aspect 52, wherein the monitoring schedule includes at least one of a number of times the first public warning notification is repeated or a time interval between adjacent repetitions of the first public warning notification.

Aspect 54. The method according to any of Aspects 52 or 53, wherein: the first public warning notification comprises an identifier associated with the public warning notification and a repetition identifier associated with the public warning notification; and the method further comprises refraining from monitoring for the public warning notification, based on the identifier and the repetition identifier, for a duration.

Aspect 55. A method of wireless communication by a network entity, comprising: transmitting, to a user equipment (UE), a first signal indicating that a first public warning notification is available for reception; and transmitting, to the UE and after the first signal, the first public warning notification based on the first signal.

Aspect 56. The method of Aspect 55, wherein the first signal further indicates a first identifier associated with the first public warning notification.

Aspect 57. The method of Aspect 56, further comprising: transmitting a second signal indicating that the first public warning notification is available for reception and the identifier; and transmitting, after the second signal, the first public warning notification.

Aspect 58. The method of Aspect 56, further comprising: transmitting a second signal indicating that a second public warning notification is available for reception and a second identifier associated with the second public warning notification; and transmitting, after the second signal, the second public warning notification.

Aspect 59. The method according to any of Aspects 55-58, further comprising: transmitting, to the UE, an indication of a monitoring schedule for public warning notifications; and transmitting the first signal comprises transmitting the first signal based on the monitoring schedule.

Aspect 60. The method of Aspect 59, wherein the monitoring schedule depends on at least one of geographical information or a time of day.

Aspect 61. The method of Aspect 60, wherein transmitting the first signal comprises: transmitting the first signal at a first period in a first area or at first time based on the geographical information or the time of day; and transmitting the first signal at a second period in a second area or at a second time based on the geographical information or the time of day, wherein the first period is different from the second period.

Aspect 62. The method according to any of Aspects 59-61, wherein the monitoring schedule includes at least one of a number of times the public warning notification is repeated or a time interval between adjacent repetitions of the public warning notification.

Aspect 63. The method of Aspect 62, further comprising: repeating transmission of the first the public warning notification based on the number of times the public warning notification is repeated and the time interval between adjacent repetitions of the public warning notification.

Aspect 64. An apparatus for wireless communication, comprising: means for receiving, from a network entity, an indication of a monitoring schedule for public warning notifications; and means for monitoring for a public warning notification based on the monitoring schedule.

Aspect 65. The apparatus of Aspect 64, wherein the apparatus comprises means for performing any of Aspects 31 through 38.

Aspect 66. An apparatus for wireless communication, comprising: means for transmitting, to a user equipment (UE), an indication of a monitoring schedule for public warning notifications; and means for transmitting, to the UE, a public warning notification based on the monitoring schedule.

Aspect 67. The apparatus of Aspect 66, wherein the apparatus comprises means for performing any of Aspects 39 through 47.

Aspect 68. An apparatus for wireless communication, comprising: means for receiving, from a network entity, a first signal indicating that a first public warning notification is available for reception; and means for receiving, from the network entity and after the first signal, the first public warning notification based on the first signal.

Aspect 69. The apparatus of Aspect 68, wherein the apparatus comprises means for performing any of Aspects 48 through 54.

Aspect 70. An apparatus for wireless communication, comprising: means for transmitting, to a user equipment (UE), a first signal indicating that a first public warning notification is available for reception; and means for transmitting, to the UE and after the first signal, the first public warning notification based on the first signal.

Aspect 71. The apparatus of Aspect 70, wherein the apparatus comprises means for performing any of Aspects 55 through 63.

Aspect 72. A computer readable medium having instructions stored thereon for: receiving, from a network entity, an indication of a monitoring schedule for public warning notifications; and monitoring for a public warning notification based on the monitoring schedule.

Aspect 73. The computer readable medium of Aspect 72, the computer readable medium having instructions stored thereon to perform any of Aspects 31 through 38.

Aspect 74. A computer readable medium having instructions stored thereon for: transmitting, to a user equipment (UE), an indication of a monitoring schedule for public warning notifications; and transmitting, to the UE, a public warning notification based on the monitoring schedule.

Aspect 75. The computer readable medium of Aspect 74, the computer readable medium having instructions stored thereon to perform any of Aspects 39 through 47.

Aspect 76. A computer readable medium having instructions stored thereon for: receiving, from a network entity, a first signal indicating that a first public warning notification is available for reception; and receiving, from the network entity and after the first signal, the first public warning notification based on the first signal.

Aspect 77. The computer readable medium of Aspect 76, the computer readable medium having instructions stored thereon to perform any of Aspects 48 through 54.

Aspect 78. A computer readable medium having instructions stored thereon for: transmitting, to a user equipment (UE), a first signal indicating that a first public warning notification is available for reception; and transmitting, to the UE and after the first signal, the first public warning notification based on the first signal.

Aspect 79. The computer readable medium of Aspect 78, the computer readable medium having instructions stored thereon to perform any of Aspects 55 through 63.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of a list of items refers to any combination of those items, including single members". As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
a memory; and
a processor coupled to the memory, the processor and the memory configured to:
  receive, from a network entity, an indication of a monitoring schedule for public warning notifications,
  monitor for a public warning notification based on the monitoring schedule,
  receive a first signal indicating that a first public warning notification is available for reception and a first identifier associated with the first public warning notification,
  receive, after the first signal, the first public warning notification,
  receive a second signal indicating that the first public warning notification is available for reception and the first identifier, and
  refrain from monitoring, after the second signal, for the first public warning notification, for a duration.

2. The apparatus of claim 1, wherein the processor and the memory are further configured to receive the first signal based on the monitoring schedule.

3. The apparatus of claim 1, wherein the first public warning notification is based on the first identifier, and wherein the processor and the memory are further configured to:
  receive a third signal indicating that a second public warning notification is available for reception and a second identifier associated with the second public warning notification, wherein the second public warning notification is based on the second identifier; and
  receive, after the second signal, the second public warning notification based on the second identifier.

4. The apparatus of claim 1, wherein the monitoring schedule includes at least one of a number of times the public warning notification is repeated or a time interval between adjacent repetitions of the public warning notification.

5. The apparatus of claim 4, wherein the processor and the memory are further configured to:
  receive the first public warning notification comprising the first identifier associated with the public warning notification and a repetition identifier associated with the public warning notification, and
  refrain from monitoring for the public warning notification, based on the first identifier and the repetition identifier, for a duration.

6. An apparatus for wireless communication, comprising:
a memory; and
a processor coupled to the memory, the processor and the memory being configured to:
  transmit, to a user equipment (UE), an indication of a monitoring schedule for public warning notifications,
  transmit a first signal indicating that a first public warning notification is available for reception and a first identifier associated with the first public warning notification,
  transmit, after the first signal, to the UE, the first public warning notification based on the monitoring schedule,
  transmit a second signal indicating that the first public warning notification is available for reception and the first identifier, and
  transmit, after the second signal, the first public warning notification.

7. The apparatus of claim 6, wherein the monitoring schedule depends on at least one of geographical information or a time of day.

8. The apparatus of claim 7, wherein the processor and the memory are further configured to:
transmit the first public warning notification at a first period in a first area or at a first time based on the geographical information or the time of day, and
transmit the first public warning notification at a second period in a second area or at a second time based on the geographical information or the time of day, wherein the first period is different from the second period.

9. The apparatus of claim 6, wherein the processor and the memory are further configured to:
transmit a third signal indicating that a second public warning notification is available for reception and a second identifier associated with the second public warning notification, and
transmit, after the second signal, the second public warning notification.

10. The apparatus of claim 6, wherein:
the monitoring schedule includes at least one of a number of times the first public warning notification is repeated or a time interval between adjacent repetitions of the first public warning notification, and
the processor and the memory are further configured to repeat transmission of the first public warning notification based on the number of times the first public warning notification is repeated and the time interval between adjacent repetitions of the public warning notification.

11. An apparatus for wireless communication, comprising:
a memory; and
a processor coupled to the memory, the processor and the memory being configured to:
receive, from a network entity, a first signal indicating that a first public warning notification is available for reception,
receive, from the network entity and after the first signal, the first public warning notification based on the first signal,
receive a second signal indicating that the first public warning notification is available for reception, and
refrain from monitoring, after the second signal, for the first public warning notification, for a duration.

12. The apparatus of claim 11, wherein:
the first signal further indicates a first identifier associated with the first public warning notification; and
the processor and the memory are further configured to receive the first public warning notification based on the first identifier.

13. The apparatus of claim 12, wherein
the second signal further indicates the first identifier, and
the processor and the memory are further configured to refrain from monitoring, after the second signal, for the first public warning notification based on the first identifier for a duration.

14. The apparatus of claim 12, wherein the processor and the memory are further configured to:
receive a third signal indicating that a second public warning notification is available for reception and a second identifier associated with the second public warning notification, and
receive, after the second signal, the second public warning notification based on the second identifier.

15. The apparatus of claim 11, wherein the processor and the memory are further configured to:
receive, from the network entity, an indication of a monitoring schedule for public warning notifications, and
receive the first signal comprises monitoring for the first signal based on the monitoring schedule.

16. The apparatus of claim 15, wherein the monitoring schedule includes at least one of a number of times the first public warning notification is repeated or a time interval between adjacent repetitions of the first public warning notification.

17. The apparatus of claim 15, wherein:
the first public warning notification comprises an identifier associated with the first public warning notification and a repetition identifier associated with the first public warning notification; and
the processor and the memory are further configured to refrain from monitoring for the first public warning notification, based on the identifier and the repetition identifier, for a duration.

18. An apparatus for wireless communication, comprising:
a memory; and
a processor coupled to the memory, the processor and the memory being configured to:
transmit, to a user equipment (UE), a first signal indicating that a first public warning notification is available for reception,
transmit, to the UE and after the first signal, the first public warning notification based on the first signal,
transmit a second signal indicating that the first public warning notification is available for reception, and
transmit, after the second signal, the first public warning notification.

19. The apparatus of claim 18, wherein the processor and the memory are further configured to:
transmit a third signal indicating that a second public warning notification is available for reception, and
transmit, after the second signal, the second public warning notification.

20. The apparatus of claim 18, wherein the processor and the memory are further configured to:
transmit, to the UE, an indication of a monitoring schedule for public warning notifications, and
transmit the first signal comprising transmitting the first signal based on the monitoring schedule.

21. The apparatus of claim 20, wherein:
the monitoring schedule depends on at least one of geographical information or a time of day; and
the processor and the memory are further configured to:
transmit the first signal at a first period in a first area or at first time based on the geographical information or the time of day, and
transmit the first signal at a second period in a second area or at a second time based on the geographical information or the time of day, wherein the first period is different from the second period.

22. The apparatus of claim 20, wherein:
the monitoring schedule includes at least one of a number of times the public warning notification is repeated or a time interval between adjacent repetitions of the public warning notification; and
the processor and the memory are further configured to repeat transmission of the public warning notification based on the number of times the public warning notification is repeated and the time interval between adjacent repetitions of the public warning notification.

\* \* \* \* \*